United States Patent
Ojima et al.

(10) Patent No.: US 7,588,848 B2
(45) Date of Patent: Sep. 15, 2009

(54) FUEL CELL CONTROLLER AND CONTROL METHOD

(75) Inventors: Kuniaki Ojima, Saitama (JP); Koichiro Miyata, Saitama (JP); Kenichiro Ueda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 747 days.

(21) Appl. No.: 11/124,478

(22) Filed: May 6, 2005

(65) Prior Publication Data

US 2005/0277004 A1 Dec. 15, 2005

(30) Foreign Application Priority Data

Jun. 9, 2004 (JP) ............ P2004-171111

(51) Int. Cl.
  *H01M 8/00* (2006.01)
  *H01M 8/04* (2006.01)
(52) U.S. Cl. .................. 429/23; 429/12; 429/22; 429/24; 429/34
(58) Field of Classification Search ........ None
  See application file for complete search history.

(56) References Cited

U.S. PATENT DOCUMENTS

| | | | |
|---|---|---|---|
| 6,299,996 B1 | 10/2001 | White et al. | |
| 6,589,678 B1 | 7/2003 | McElroy | |
| 6,696,190 B2 | 2/2004 | Haridoss | |
| 2002/0045080 A1* | 4/2002 | Andou et al. | 429/20 |
| 2004/0013919 A1* | 1/2004 | Ueda et al. | 429/22 |

FOREIGN PATENT DOCUMENTS

JP 11-97047 4/1999

\* cited by examiner

*Primary Examiner*—Dah-Wei D Yuan
*Assistant Examiner*—Katherine Turner
(74) *Attorney, Agent, or Firm*—Fish & Richardson P.C.

(57) ABSTRACT

The following control is performed. During startup of a fuel cell 1, a fuel gas is supplied to an anode 1b of the fuel cell 1 and an oxidant gas is supplied to a cathode 1c of the fuel cell 1, thereby starting power generation. Fuel gas externally emitted from the abode 1b is diluted with an oxidant gas externally emitted from the cathode 1c. From a start to end of discharge of a fuel gas from the anode 1b, a flow rate required for dilution of the oxidant gas, and a flow rate required for an external output, being calculated on the basis of the power requested for the fuel cell 1, are respectively calculated. The flow rate required for dilution and the flow rate required for an external output are compared, and a larger flow rate is set as a flow rate of the oxidant gas.

6 Claims, 5 Drawing Sheets

FUEL CELL CONTROLLER AND CONTROL METHOD

This application claims foreign priority based on Japanese Patent application No. 2004-171111, filed Jun. 9, 2004, the contents of which is incorporated herein by reference in its entirety.

BACKGROUND OF THE INVENTION

1. Field of the Invention

The present invention relates to a fuel cell controller and control method for controlling a fuel cell during a period of purging reaction gas from an anode of the fuel cell, in particular, during startup period thereof.

2. Description of the Related Art

Some fuel cells to be mounted on a fuel cell vehicle, or the like, acquire electric power by inducing chemical reaction of reaction gases. An example of a fuel cell of this type is configured to have an anode and a cathode provided on opposite sides of a solid polymer electrolyte membrane; to supply a fuel gas (for instance, a hydrogen gas) to the anode; and to supply an oxidant gas (for instance, oxygen-containing air) to the cathode, thereby directly extracting chemical energy derived from an oxidation-reduction reaction between these reaction gases as electric energy.

In the fuel cell, water is produced at the cathode side in conjunction with generation of electric power. Some of the thus-generated water is also immersed into the anode by penetrating through the solid polymer electrolyte membrane. In addition, although it is very small quantity, nitrogen contained in the air supplied to the cathode reaches the anode by permeating through the solid polymer electrolyte membrane, and is mixed in the hydrogen gas. Therefore, these impurities in the anode, such as the water content or nitrogen, which ends up with the generation of the fuel cell being instable.

In particular, in a circulatory fuel cell system in which unreacted fuel gas emitted from a fuel cell is recycled and resupplied to the fuel cell for increasing a fuel utilization ratio, an impurity concentration of the anode is likely to increase when stopping condition of the fuel cell lasts for a long time.

For this reason, a technique is proposed in connection with a fuel cell of this type such as disclosed in JP-A-11-97047, where the reaction gases are supplied upon startup with discharging the fuel gas in the fuel cell by opening an emission valve disposed downstream of the anode of the fuel cell, and when an output voltage of the fuel cell attains a predetermined value or higher, the emission valve is closed, whereupon external output is started.

Meanwhile, there are some cases where, when the reaction gas from the anode of a fuel cell has been purged; in particular, immediately after startup, external output power is already requested in accordance with a request for activating another device (for instance, in the case of a fuel cell vehicle whose drive source is a fuel cell, depression of an accelerator pedal), or the like. However, according to the related art, during the course of cleaning operation performed during startup of the fuel cell, the oxidant gas from the cathode is required for the purpose of diluting the reaction gas of the anode to be a predetermined concentration or lower. As a result, the oxidant gas required for such an external output cannot be provided, and a high external output is restricted. Accordingly, there arises a problem that supply of the external output cannot be started until a fuel gas emission valve is closed, and, even when the external output can be supplied, quantity of external output is significantly restricted, thus impairing startup performance.

SUMMARY OF THE INVENTION

To this end, the present invention aims at providing a fuel cell controller and control method which enable prompt start for supplying an external output when a reaction gas of an anode of the fuel cell is purged; in particular, immediately after startup, thereby enhancing startup performance.

The first aspect in this invention provides a fuel cell controller comprising:

a fuel cell (e.g., a fuel cell 1 in an embodiment);

fuel gas supply means (e.g., fuel gas supply means 2 in the embodiment) for supplying a fuel gas to an anode (e.g., an anode 1b in the embodiment) of the fuel cell;

fuel gas emission means (e.g., a fuel gas emission valve 10 in the embodiment) which is disposed downstream of the anode and which emits a fuel gas externally released from the anode to the outside of the fuel cell;

a dilution section (e.g., a dilution section 17 in the embodiment) which is disposed downstream of the fuel gas emission means and which dilutes the emitted fuel gas with an oxidant gas released from a cathode of the fuel cell, a control section (e.g., an ECU 12 in the embodiment) having requested power input means (e.g., the ECU 12 in the embodiment) for inputting requested power to the fuel cell and target oxidant gas flow rate setting means (e.g., the ECU 12 in the embodiment) for setting a target flow rate of oxidant gas; and oxidant gas flow rate regulation means (e.g., the ECU 12 in the embodiment) which is disposed downstream of the cathode and which regulates a flow rate of oxidant gas in accordance with a value obtained by the target oxidant gas flow rate setting means, wherein the control section closes the fuel gas emission means when a predetermined amount of fuel gas has been emitted and computes a flow rate of oxidant gas required for diluting the fuel gas (e.g., a flow rate QA required for dilution in the embodiment), and a flow rate of the oxidant gas required for an external output (e.g., a flow rate QB for an external output in the embodiment) on the basis of the requested power level obtained by the requested power input means; and the target oxidant gas flow rate setting means compares the flow rate required for dilution and the flow rate required for an external output, thereby adopting a larger value as a set value.

According to the invention, when the reaction gas from the anode of the fuel cell is purged; in particular, during startup, the control section opens the fuel gas supply means and the fuel gas emission means, thereby supplying the fuel gas to the anode of the fuel cell, and starting cleaning of the anode of the fuel cell. At this time, supply of a required amount of oxidant gas to the cathode of the fuel cell enables cleaning of the cathode while causing the fuel cell to start supplying an external output.

A fuel gas having been emitted from the anode (a fuel off-gas) is diluted with an oxidant gas having been emitted from the cathode (an oxidant off-gas). The target oxidant gas flow rate setting means compares the flow rate required for dilution with the flow rate required for an external output, and adopts a larger value as a set value. Hence, when the flow rate required for dilution is larger than the flow rate required for an external output, the flow rate required for dilution is assumed to be a set value, and supply of an external output is also performed within the range of the flow rate required for cleaning. Meanwhile, when the flow rate required for dilution is smaller than the flow rate required for an external output, the flow rate required for an external output is adopted as a set value. Accordingly, the requested electric power can be externally output from the fuel cell is allowed while cleaning is being performed. Therefore, from immediately after startup of the fuel cell 1, the requested external output power can be supplied while cleaning is performed, thereby enhancing startup performance.

The second aspect in this invention is characterized by performing control operations of:

supplying a fuel gas to an anode of a fuel cell and an oxidant gas to a cathode of the fuel cell, thereby starting power generation;

diluting a fuel gas externally released from the anode with an oxidant gas externally released from the cathode;

respectively computing, from a start to an end of emission of the fuel gas from the anode, a flow rate of oxidant gas required for diluting the fuel gas and a flow rate of oxidant gas required for an external output which is to be calculated on a basis of a requested power level requested for the fuel cell; and comparing the flow rate required for dilution with the flow rate required for an external output, thereby setting a larger flow rate as a flow rate of oxidant gas.

According to the invention, when the reaction gas of the anode of the fuel cell is purged; in particular, during startup, supply of an external output is started, and the fuel gas is emitted from the anode, to thus perform cleaning operation. The fuel gas emitted from the anode (fuel off-gas) is diluted with the oxidant gas emitted from the cathode (oxidant off-gas). The flow rate required for dilution and the flow rate required for an external output are compared with each other, and a larger flow rate is set as a flow rate of the oxidant gas. Accordingly, when the flow rate required for dilution is larger than the flow rate required for an external output, the flow rate required for dilution is set as the flow rate of the oxidant gas, whereby supply of an external output is also performed within the range of a flow rate required for cleaning. Meanwhile, when the flow rate required for dilution is smaller than the flow rate required for an external output, the flow rate required for an external output is set, whereby the fuel cell can be caused to output the requested electric power while the cleaning is performed. Accordingly, the requested external output power can be supplied while the cleaning operation is being performed, thereby enhancing startup performance.

According to the inventions being described in the first aspect and the second aspect, from immediately after startup of the fuel cell, the requested external output power can be supplied while the cleaning operation is being performed, thereby enhancing startup performance.

DESCRIPTION OF THE PREFERRED EMBODIMENTS

Embodiments of the present invention will be described hereinbelow by reference to the drawings. Unless otherwise specifically defined in the specification, terms have their ordinary meaning as would be understood by those of ordinary skill in the art.

Hereinbelow, a fuel cell controller and a control method for the same according to an embodiment of the invention will be described by reference to the drawings.

Figure 1:
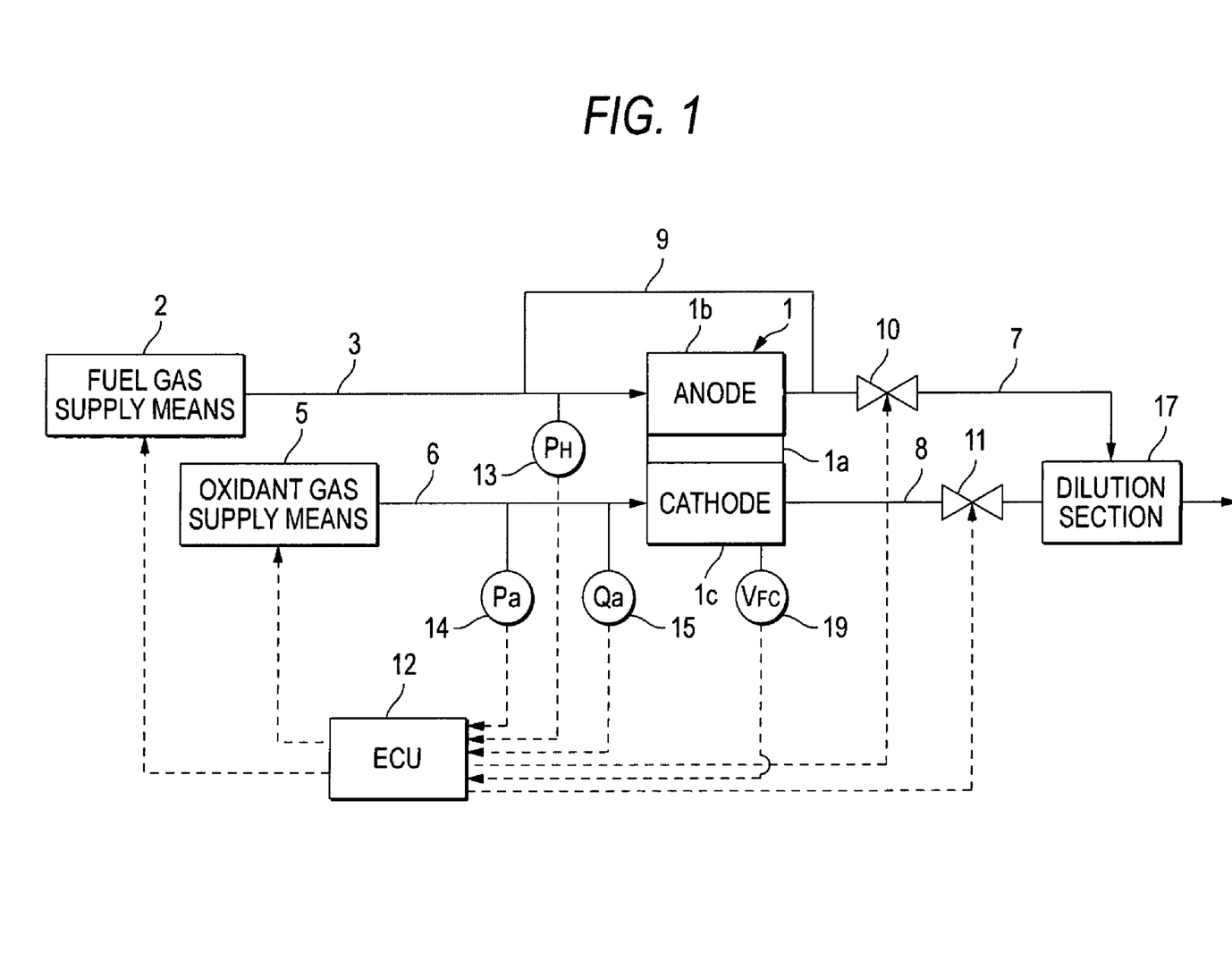
FIG. 1 is schematic constitutional view of a fuel cell according to an embodiment of the present invention.

FIG. 1 is a view showing the overall configuration of a fuel cell controller to which the invention is applied.

As shown in the drawing, a fuel cell 1 is constituted of a stack (for simplification, the drawing shows only a single cell). The stack is formed by means of stacking a plurality of cells, each of which is constructed by sandwiching a solid polymer electrolyte membrane 1a (hereinafter referred to as an "electrolyte membrane 1a") constituted of, for instance, a solid polymer ion exchange membrane, between an anode 1b and a cathode 1c from opposite sides of the electrolyte membrane 1a.

When hydrogen is supplied to the anode 1b of the fuel cell 1 as a fuel, and oxygen-containing air is supplied to the cathode 1c of the same as an oxidant, then the hydrogen ions, which are generated by a catalytic reaction occurring at the anode 1b, permeate the electrolyte membrane 1a, and move to the cathode 1c, where said hydrogen ions undergo an electrochemical reaction with oxygen, thereby generating electric power.

Meanwhile, in conjunction with generation of electric power, water is generated by the cathode 1c. In addition, some of the water generated by the cathode 1c is reversely diffused to the anode 1b side through the electrolyte membrane 1a. Consequently, water is also present on the anode 1b.

The fuel cell 1 is supplied with hydrogen and air, which serve as reaction gases, from fuel gas supply means 2 and oxidant gas supply means 5, respectively. The fuel gas supply means 2 includes a fuel tank for storing a fuel gas (hydrogen). The fuel gas from the fuel gas supply means 2 is supplied to the anode 1b by way of an unillustrated shut-down valve and a regulator, and a fuel gas supply channel 3.

In addition, a pressure sensor 13 is disposed in the vicinity of an inlet of the anode 1b of the fuel gas supply channel 3, thereby enabling detection of pressure of a fuel gas flowing into the anode 1b.

An unconsumed, unreacted fuel off-gas is emitted from the anode 1b to a fuel gas circulating channel 9 in conjunction with residual water of the anode 1b, such as the product water, and merges into the fuel gas supply channel 3. More specifically, the fuel off-gas having been emitted from the fuel cell 1 merges with fresh fuel gas supplied from the fuel gas supply means 2, and is again supplied to the anode 1b of the fuel cell 1. In addition, a fuel gas discharge channel 7 branched from the fuel gas circulating channel 9 is connected to a dilution section 17. A fuel gas emission valve 10 is disposed in the fuel gas discharge channel 7. By means of opening of the fuel gas emission valve 10, a spent fuel off-gas is discharged to the dilution section 17 by way of the fuel gas discharge channel 7.

Meanwhile, the oxidant gas supply means 5 includes a compressor (not shown) for pumping air, serving as the oxidant gas. By means of activation of the compressor, the air is supplied to the cathode 1c of the fuel cell 1 by way of an oxidant gas supply channel 6.

A pressure sensor 14 and a flow rate sensor 15 are disposed in the vicinity of an inlet of the cathode 1c of the oxidant gas supply channel 6, thereby enabling detection of a pressure and a flow rate, respectively, of the oxidant gas flowing into the cathode 1c.

The oxidant gas having been supplied to the cathode 1c of the fuel cell 1 is employed for power generation, and thereafter emitted from the fuel cell 1 as an off-gas in conjunction with residual water of the cathode 1c side, such as the product water, to an oxidant gas discharge channel 8.

The oxidant gas discharge channel 8 is connected to the dilution section 17. Accordingly, the oxidant off-gas having been emitted from the oxidant gas discharge channel 8 is mixed with the fuel off-gas within the dilution section 17.

As a result, the fuel off-gas having been emitted from the fuel gas discharge channel 7 is diluted to a predetermined concentration or lower by the dilution section 17.

The fuel cell 1 has a cooling water channel (not shown), and the like, including a circulating pump for circulating cooling water. The cooling water is circulated during the course of activation of the fuel cell 1, whereby the fuel cell 1 is controlled to a temperature (e.g., 80° C.) suitable for the electrochemical reaction.

In addition, a voltage sensor 19 for measuring a voltage of each cell constituting the fuel cell 1 is disposed in the fuel cell 1. The fuel cell 1 causes the voltage sensor 19 to detect a state of power generation in each cell.

The controller of the fuel cell 1 includes an ECU 12 for controlling the system. Signals pertaining to ignition ON and OFF (IG-ON, IG-OFF) from an ignition switch, detection values from the pressure sensors 13, 14, and the flow rate sensor 15 are input to a control section (not shown) of the ECU 12. The control section of the ECU 12 outputs signals for activating the fuel gas supply means 2, the oxidant gas supply means 5, the fuel gas emission valve 10, and an oxidant gas emission valve 11 on the basis of the thus-input detection values and signals.

Figure 2:
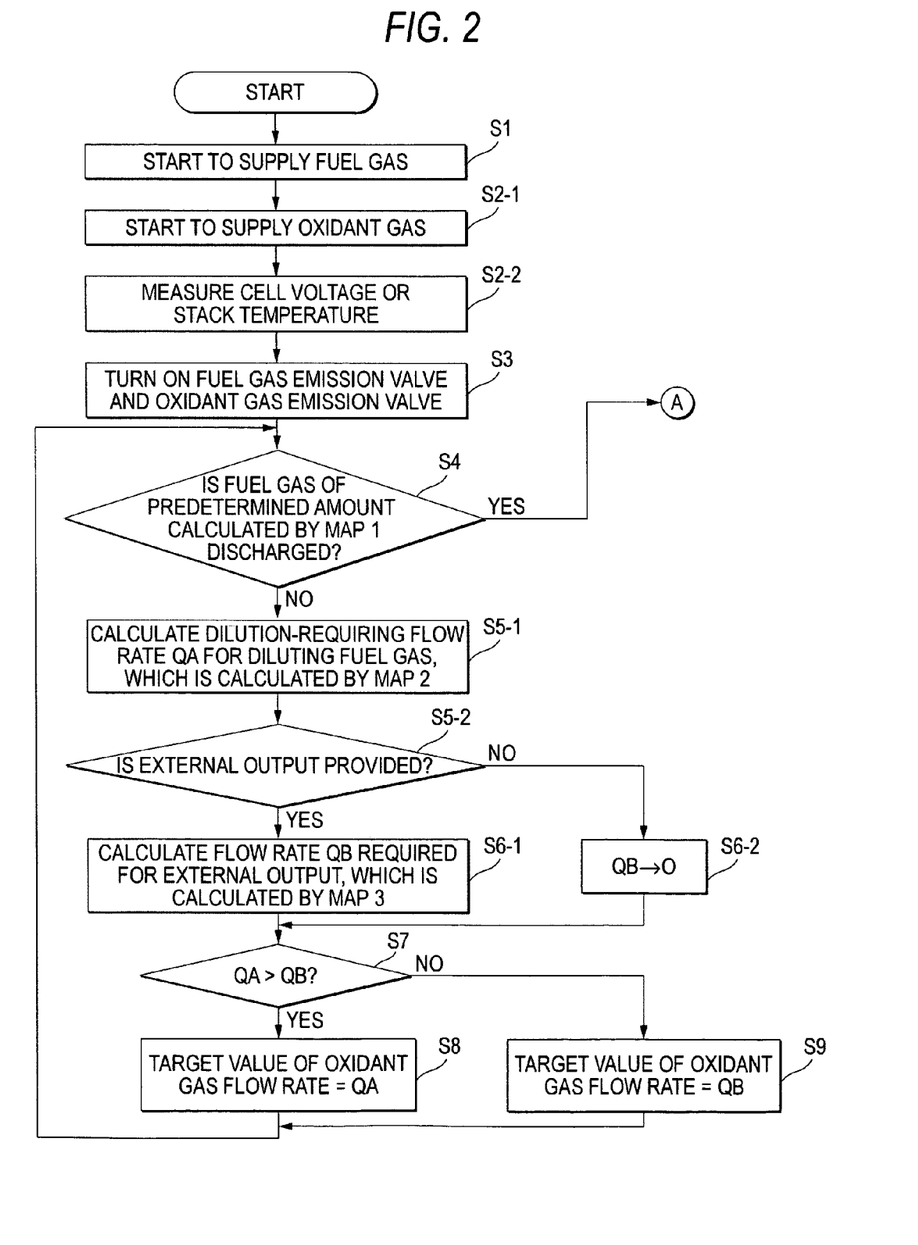
FIG. 2 is a flowchart showing processing of flow rate control of reaction gases of the invention.
Figure 3:
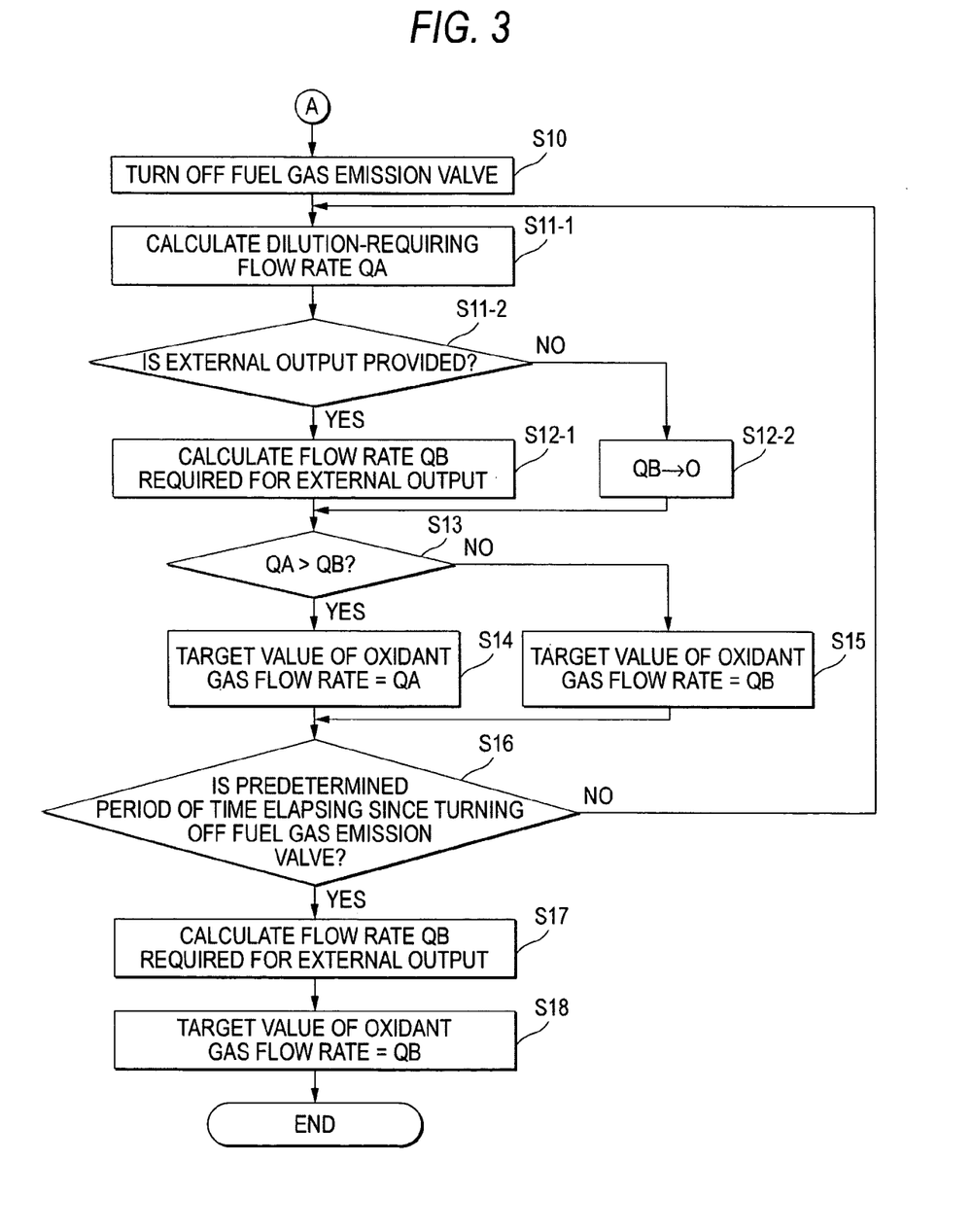
FIG. 3 is a flowchart showing processing of the flow rate control of the reaction gases of the invention.

Control of flow rate of reaction gases by means of a controller configured as above will be described by reference to FIGS. 2 and 3. FIGS. 2 and 3 are flowcharts showing processing of flow rate control of reaction gases. First, in step S1, a reclosable valve (not shown) of the fuel gas supply means 2 is opened, to thus supply a fuel gas (hydrogen) to the anode 1b by way of the fuel gas supply channel 3. In step S2-1, the compressor of the oxidant gas supply means 5 is activated, to thus supply an oxidant gas (air) to the cathode 1c by way of the oxidant gas supply channel 6. Thus, the reaction gases are respectively supplied to the anode 1b and the cathode 1c of the fuel cell 1, whereupon the fuel cell 1 is started. In step S2-2, voltages of the cells or a temperature of the stack is measured. In this case, a voltage of each cell is measured by means of the voltage sensor 19.

In step S3, the fuel gas emission valve 10 is turned on (open), thereby enabling discharge, through the fuel gas discharge channel 7, of the gases, water, and the like remaining in the anode 1b. At this time, the oxidant gas emission valve 11 is also turned on (open), thereby enabling gases, water, and the like, remaining in the cathode 1c to be discharged through the oxidant gas discharge channel 8.

Figure 4A:
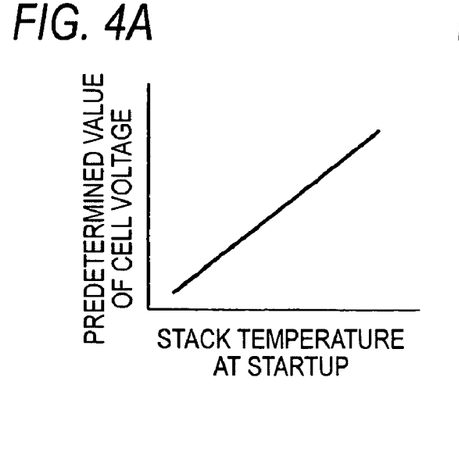
FIG. 4A is a graph showing a relationship between a predetermined value of a cell voltage and a stack temperature at startup (a map 1a)
Figure 4B:
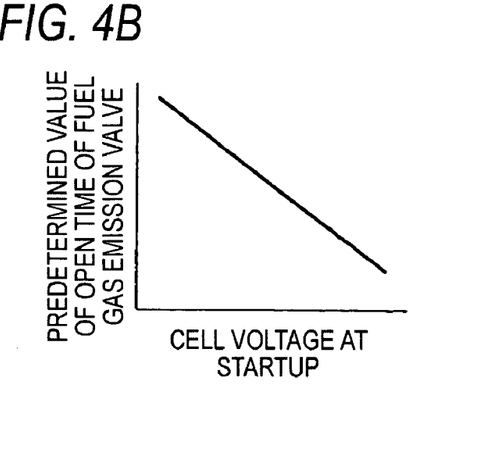
FIG. 4B is a graph showing a relationship between a predetermined value of open time of a fuel gas emission valve and a cell voltage at startup (a map 1b)

In step S4, a determination is made as to whether or not the fuel gas has been discharged, in accordance with whether or not the cell voltage or the stack temperature has reached a predetermined value which is calculated with use of a map 1a or 1b (see FIGS. 4A and 4B). In other words, a determination is made as to whether or not cleaning performed during startup of the fuel cell 1 has completed.

FIG. 4A is a graph (the map 1a) showing a relationship between the predetermined value of the cell voltage and the stack temperature at startup. As shown in the drawing, the predetermined value of the cell voltage and the stack temperature at startup are in a substantially proportional relationship. When the stack temperature at startup is high, activities of the cells are high, whereby the cell voltage is increased within a short period of time. Hence, since the cell voltage is estimated to be high after discharge of impurity gas, the predetermined value of the cell voltage is set high. In contrast, when the stack temperature at startup is low, activities of the cells are low. Accordingly, since the cell voltage requires time to increase to a high value, the predetermined value of the cell voltage is set low. Hence, since introduction of the fuel gas to the anode is suppressed even after the impurity gas from the anode is discharged, power consumption by the compressor can be suppressed.

FIG. 4B is a graph (the map 1b) showing a relationship between a predetermined value of open time of the fuel gas emission valve and the cell voltage at startup. The "cell voltage at startup" referred to herein means the lowest cell voltage among voltages measured for the respective cells of the fuel cell 1 in step S2-2. As shown in the drawing, the predetermined value of the open time of the fuel gas emission valve and the cell voltage at startup are in a substantially inverse proportional relationship. When the stack temperature at startup is low, an estimation can be made that an impurity gas or the like has contaminated the fuel cell 1, and placement of the fuel cell 1 under an environment where external output is difficult. Accordingly, the predetermined value of the open time of the fuel gas emission valve is set high, thereby setting high an amount of the fuel gas to be introduced to the anode. Meanwhile, when voltage of any cell at startup is the predetermined value or higher, an amount of the oxidant gas required for diluting the fuel gas is set low as compared with a case where the cell voltage at startup is low. Accordingly, power consumption by the compressor can be suppressed.

When the result of determination in step S4 is YES, processing proceeds to step S10. When the result is NO, processing proceeds to step S5-1. Processing pertaining to step S5-1 will be described hereinbelow, and processing pertaining to step S10 and subsequent steps will be described later.

In step S5-1, the flow rate QA required for dilution, which is a flow rate of the oxidant gas required for diluting the fuel gas and which is calculated with use of a map 2a or 2b (see FIGS. 5A and 5B), is calculated.

Figure 5A:
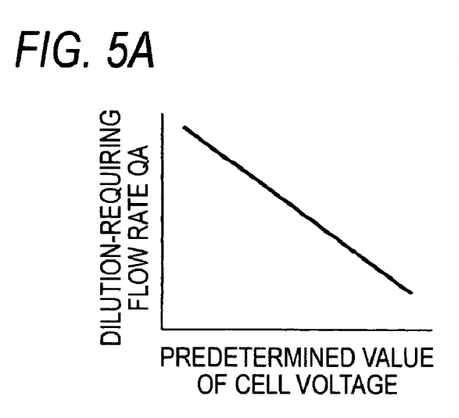
FIG. 5A is a graph showing a relationship between a flow rate QA required for dilution and the predetermined value of the cell voltage (a map 2a)

FIG. 5A is a graph (the map 2a) showing a relationship between the flow rate QA required for dilution and the predetermined value of the cell voltage. As shown in the drawing, the flow rate QA required for dilution and the predetermined value of the cell voltage are in a substantially inverse proportional relationship. This is because, according to the relation shown in FIG. 4A, the greater the predetermined value of the cell voltage, the shorter a period of time required for cleaning, whereby a flow rate of the oxidant gas required for the cleaning is decreased.

Figure 5B:
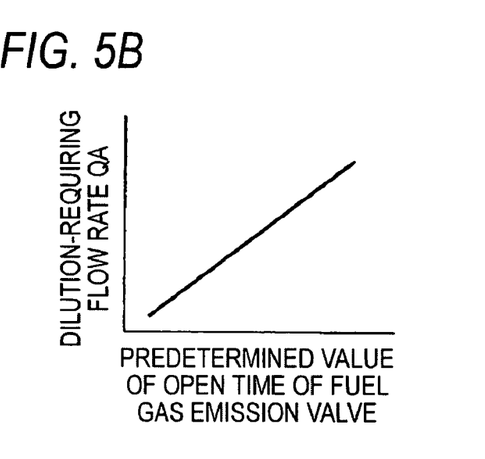
FIG. 5B is a graph showing a relationship between the flow rate QA required for dilution and the predetermined value of the open time of a fuel gas emission valve (a map 2b)

FIG. 5B is a graph (the map 2b) showing a relationship between the flow rate QA required for dilution and the predetermined value of the open time of the fuel gas emission valve. As shown in the drawing, the flow rate QA required for dilution and the predetermined value of the open time of the fuel gas emission valve are in a substantially proportional relationship. This is because the greater the predetermined value of the open time of the fuel gas emission valve, the greater the flow rate of the oxidant gas required for the cleaning.

Next, in step S5-2, a determination is made as to whether or not the fuel cell 1 is supplying an external output. In other words, a determination is made as to whether or not the fuel cell 1 is supplying power to an external device. When the result of this determination is YES, processing proceeds to step S6-1. When the result is NO, processing proceeds to step S6-2.

Figure 6:
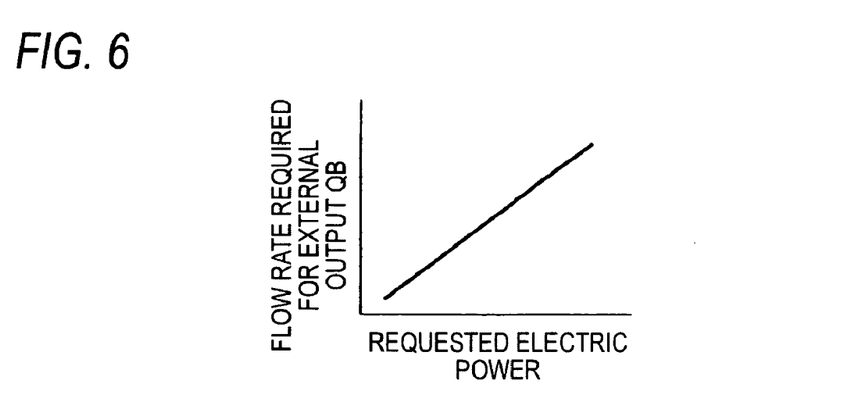
FIG. 6 is a graph (a map 3) showing a relationship between a flow rate QB required for an external output and requested electric power.

In step S6-1, a flow rate QB required for an external output, which is a flow rate of the oxidant gas required for external output and which is calculated with use of a map 3 (see FIG. 6), is calculated. FIG. 6 is a graph (the map 3) showing a relationship between the flow rate QB required for an external output and requested electric power. As shown in the drawing, the flow rate QB required for an external output and the requested electric power are in a substantially proportional relationship. This is because, when the requested electric power is high, a larger amount of the reaction gas must be caused to flow into the fuel cell 1. The requested electric power varies in accordance with a degree of pedal depression of the accelerator pedal, or an operation state of auxiliary devices, in a case of a fuel cell vehicle on which the fuel cell 1 is mounted.

Meanwhile, in step S6-2, the external output is not supplied; that is, the requested electric power is "0." Accordingly, the flow rate QB required for an external output is set to "0."

After processing pertaining to step S6-1 or that in step S6-2 is performed, processing proceeds to step S7. In step S7, a determination is made as to whether or not the flow rate QA required for dilution is larger than the flow rate QB required for an external output. When the result of this determination is YES, processing proceeds to step S8. When the result is NO, processing proceeds to step S9. In step S8, a target value of the oxidant gas flow rate is set to the flow rate QA required for dilution, and processing returns to step S4. At this time, external output is also performed within a range allowing for a flow rate required for cleaning.

In step S9, the target value of the oxidant gas flow rate is set to the flow rate QB required for an external output, and processing returns to step S4. As a result, the fuel cell can be caused to externally output the requested power while the cleaning is performed. Accordingly, from immediately after startup of the fuel cell 1, the requested external output power can be supplied while the cleaning is performed, thereby enhancing startup performance.

Herein below, processing pertaining to step S10 and subsequent steps will be described. In step S10, the fuel gas emission valve 10 is turned off (closed). In step S11-1, the flow rate QA required for dilution, which is a flow rate of the oxidant gas required for diluting a fuel gas downstream of the fuel gas emission valve 10, is calculated with use of the map 2a or 2b. In step S11-2, a determination is made as to whether or not the fuel cell 1 is supplying the external output. When the result of this determination is YES, processing proceeds to step S12-1. When the result is NO, processing proceeds to step S12-2. In step S12-1, the flow rate QB required for an external output, which is a flow rate of the oxidant gas required for external output, is calculated with use of the map 3. In step S12-2, the external output is not supplied; that is, the requested electric power is "0." Accordingly, the flow rate QB required for an external output is set to "0."

After processing pertaining to step S12-1 or that in step S12-2, processing proceeds to step S13. In step S13, a determination is made as to whether or not the flow rate QA required for dilution is larger than the flow rate QB required for an external output. When the result of this determination is YES, processing proceeds to step S14. When the result is NO, processing proceeds to step S15. In step S14, a target value of air flow rate is set to the flow rate QA required for dilution, and processing proceeds to step S16. At this time, external output is also performed within a range allowing for a flow rate required for cleaning.

In step S15, the target value of oxidant gas flow rate is set to the flow rate QB required for an external output, and processing proceeds to step S16. As a result, the fuel cell can be caused to externally output the requested power while the cleaning is performed. Accordingly, even after the emission valve 10 of the fuel cell 1 is turned off, requested external output can be supplied while cleaning is performed, thereby enhancing startup performance.

After processing pertaining to step S14 or that in step S15, processing proceeds to step S16. In step S16, a determination is made as to whether or not a predetermined period of time has elapsed after the fuel gas emission valve 10 has been turned off (closed). The predetermined period of time is a time period required for diluting the fuel gas present downstream of the emission valve 10. In step S17, the flow rate QB required for an external output is calculated. In step S18, the target value of oxidant gas flow rate is set to the flow rate QB required for an external output. Here, the cleaning operation performed during startup of the fuel cell 1 ends, and processing shifts to ordinary external output processing.

Figure 7:
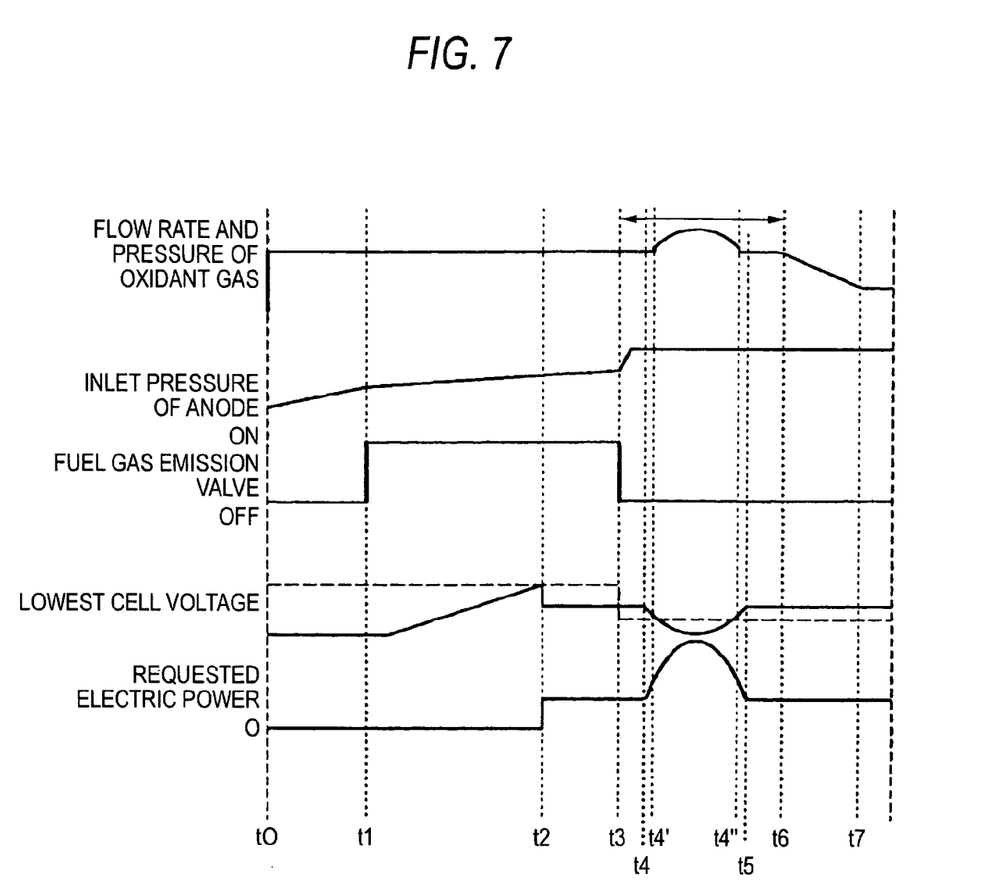
FIG. 7 is a time-series graph with regard to a flow rate and pressure of an oxidant gas, an inlet pressure of an anode, on/off of a fuel gas emission valve, the lowest cell voltage, and requested electric power.

The above-mentioned processing will be described in time series by reference to FIG. 7. FIG. 7 is a graph of time with regard to the flow rate and a pressure of the oxidant gas, the inlet pressure of the anode, an ON/OFF state of the fuel gas emission valve, the lowest cell voltage, and the requested electric power. As shown in the drawing, when the fuel cell 1 is started (time t0), supply of the reaction gases (the fuel gas and the oxidant gas) to the fuel cell 1 is started. In accordance therewith, the inlet pressure of the anode 1b increases. When the inlet pressure reaches a predetermined value (time t1), the fuel gas emission valve 10 is turned on, thereby starting the cleaning of gases in the anode 1b. At this time, a flow rate of the oxidant gas is set to the flow rate required for dilution. The reaction gases undergo electrochemical reaction within the fuel cell 1 while cleaning is performed. When the lowest cell voltage of the respective cells reaches the predetermined value (time t2), input of requested electric power to the fuel cell 1 is started. At this time, the flow rate required for dilution and the flow rate required for an external output are compared, and a flow rate of the oxidant gas is set to a larger value. Thereafter, upon completion of the cleaning operation within the fuel cell 1, the fuel gas emission valve 10 is turned off (time t3), thereby increasing the inlet pressure of the anode 1b. Hence, the external output processing is performed in conjunction with cleaning of the fuel gas downstream of the fuel gas emission valve 10 being performed. At this time, when the accelerator pedal is depressed and the requested external output power is increased (time t4 through t5), in accordance therewith, the flow rate of the oxidant gas is set to a larger value of the flow rate QA required for dilution and the flow rate QB required for an external output. Consequently, the requested external output power can be output while the cleaning processing is performed. More specifically, a relation QA>QB holds between time t4 and t4' or t4" and t5; and a relation QA>QB holds between t4' and t4". Thereafter, upon completion of the cleaning operation downstream of the emission valve 10 (time t6), the flow rate and pressure of the oxidant gas are set so as to respectively assume the value of flow rate QB and the pressure which are appropriate to the external output. Then, processing shifts to a power output operation under a normal mode of the fuel cell 1 (time t7).

As described above, according to the embodiment, from immediately after startup of the fuel cell 1, the requested external output power can be supplied while cleaning is performed, thereby enhancing startup performance.

The present invention is not limited to the above-mentioned embodiment. For instance, the invention is preferably employed for a fuel cell vehicle on which a fuel cell serving as a drive source is mounted. However, the invention can be employed in an application other than a vehicle.

In addition, in the embodiment of the invention, the control is performed at startup. However, the control may be performed when the cell voltage drops during driving.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A fuel cell controller comprising:
a fuel cell;
fuel gas supply means for supplying a fuel gas to an anode of the fuel cell;
fuel gas emission means which is disposed downstream of the anode and which emits a fuel gas released from the anode to the outside of the fuel cell;
a dilution section which is disposed downstream of the fuel gas emission means and which dilutes the emitted fuel gas with an oxidant gas released from a cathode of the fuel cell,
a control section having requested power input means for inputting requested power to the fuel cell and target oxidant gas flow rate setting means for setting a target flow rate of oxidant gas; and
oxidant gas flow rate regulation means which is disposed downstream of the cathode and which regulates a flow rate of oxidant gas in accordance with a value obtained by the target oxidant gas flow rate setting means, wherein
the control section closes the fuel gas emission means when a predetermined amount of fuel gas has been emitted;
wherein the fuel cell controller is arranged such that, during a start of anode cleaning while the fuel cell starts up, the control section computes a flow rate of oxidant gas required for diluting the fuel gas, and an external output on the basis of a flow rate of the oxidant gas required for an external output a basis of diluting the fuel gas and the requested power level obtained by the requested power input means, and the target oxidant gas flow rate setting means compares the flow rate required for dilution and the flow rate required for an external output, thereby adopting a larger value as a set value; and
the fuel cell controller is further arranged such that, after a predetermined time after an end of fuel gas emission, the oxidant gas flow rate setting means sets a target value of oxidant gas flow rate exclusively from said flow rate required for an external output.

2. A fuel cell control method for performing control operations thereof, comprising the steps of:
supplying a fuel gas to an anode of a fuel cell and an oxidant gas to a cathode of the fuel cell, thereby starting power generation;
diluting a fuel gas externally released from the anode with an oxidant gas externally released from the cathode; and
during a start of anode cleaning while the fuel cell starts up, respectively computing, from a start to an end of emission of the fuel gas from the anode, a flow rate of oxidant gas required for diluting the fuel gas, and a flow rate of oxidant gas required for an external output which is to be calculated on a basis of a requested power level requested for the fuel cell, and comparing the flow rate required for dilution with the flow rate required for an external output, thereby setting a larger flow rate as a flow rate of oxidant gas; wherein
after a predetermined time from an end of fuel gas emission, a target value of oxidant gas flow rate is employed to be said flow rate required for an external output; wherein the target value of oxidant gas flow rate is based exclusively from said flow rate required for an external output.

3. A fuel cell controller according to claim 1, wherein the oxidant gas flow rate regulation means is disposed between the cathode and the dilution section.

4. A fuel cell control method according to claim 2, further comprising:
regulating the flow rate of oxidant gas by the oxidant gas flow rate regulation means disposed between the cathode and the dilution section after comparing the flow rate required for dilution with the flow rate required for the external output.

5. A fuel cell controller according to claim 1, wherein the control section is arranged to compute the flow rate of oxidant gas required for diluting the fuel gas on the basis of a relationship between the flow rate required for dilution and a predetermined value of a cell voltage, and a relationship between the flow rate required for dilution and a predetermined value of an open time of a fuel gas emission valve.

6. A fuel cell controller according to claim 2, wherein the fuel cell controller is arranged to compute the flow rate of oxidant gas required for diluting the fuel gas on the basis of a relationship between the flow rate required for dilution and a predetermined value of a cell voltage, and a relationship between the flow rate required for dilution and a predetermined value of an open time of a fuel gas emission valve.

* * * * *